May 31, 1955     N. D. LEA     2,709,363
APPARATUS FOR DETERMINING THE TORSIONAL
SHEAR STRENGTH OF SOIL
Filed July 27, 1953     2 Sheets-Sheet 1
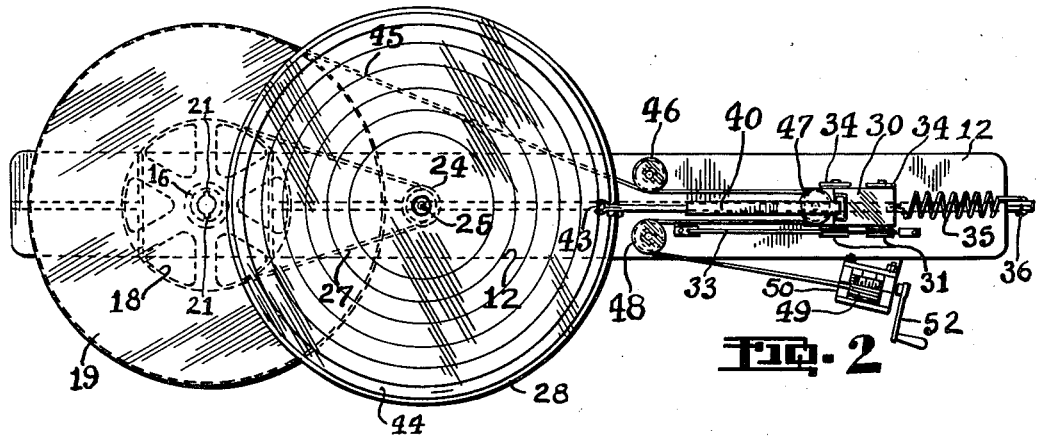
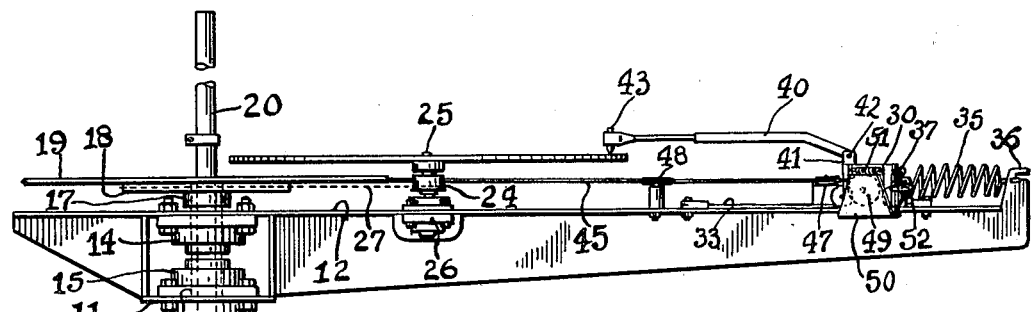
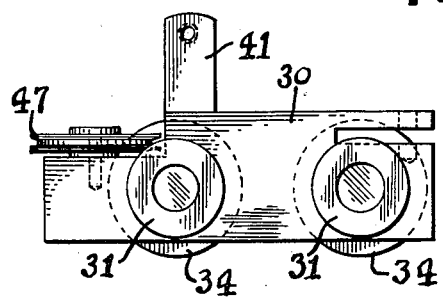
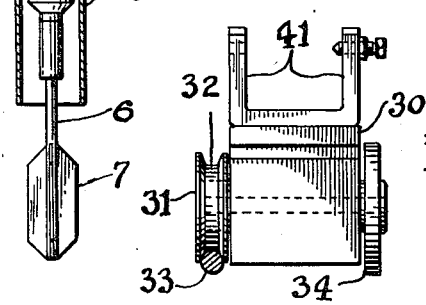
INVENTOR
NORMAN D. LEA
By Fetherstonhaugh & Co.
ATTORNEYS May 31, 1955     N. D. LEA     2,709,363
APPARATUS FOR DETERMINING THE TORSIONAL
SHEAR STRENGTH OF SOIL Filed July 27, 1953     2 Sheets-Sheet 2

INVENTOR
NORMAN D. LEA
BY *Fetherstonhaugh & Co.*
ATTORNEYS

United States Patent Office 2,709,363
Patented May 31, 1955

2,709,363

APPARATUS FOR DETERMINING THE TORSIONAL SHEAR STRENGTH OF SOIL

Norman D. Lea, Montreal, Quebec, Canada, assignor to The Foundation Company of Canada Limited, Montreal, Quebec, Canada Application July 27, 1953, Serial No. 370,546

10 Claims. (Cl. 73—89)

This invention relates to improvements in apparatus for determining the torsional shear strength or shearing resistance of a soil and more particularly for permanently recording any measurements taken in connection with the determining of such shear strength.

Heretofore, tests to determine the shear strength of soil have been carried out both in laboratory and in the field directly in the ground. For laboratory tests, samples must be removed from the ground to the laboratory. Frequently these samples become damaged during transit, making it difficult to obtain proper results in the laboratory. Then, too, confining pressures which exist around the soil in place cannot be maintained during extraction from the ground.

There are several types of apparatus employed in the field for making ground tests. However, the vane test which consists of inserting a vane, of the character described in U. S. Patent 2,603,967 to L. O. T. Carlson, into the ground and measuring the torque required to rotate the vane and shear a cylinder of soil, has been found to be the most desirable type of apparatus.

The present invention is particularly directed to an improved type of vane testing equipment which is both rugged in construction, enabling it to withstand field usage and at the same time sufficiently sensitive to record accurate computations of the shear strength and the torque required to shear a cylinder of soil at a given depth from the surrounding soil. According to the present invention, a shaft provided with a vane, having preferably four blades, is inserted in the ground to a predetermined depth with a minimum of disturbance to the surrounding area of soil. A gear mechanism is secured to the upper end of the shaft to rotate therewith. A recording disc is mounted at one side of the shaft to be driven by the gear mechanism and a stylus is also mounted for radial movement along said disc against the biasing of a calibrated spring. The vane is rotated by a tensioned cable which is also connected to move the stylus against its biasing so that extension of the calibrated spring is a measure of the torque required to rotate the vane in the soil and the radial distances recorded on the graph by movement of the stylus is a measure of the stress in the soil. This stress and the recording thereof is continued until a cylinder of the soil between the vanes is sheared from the surrounding soil.

Proceeding now to a more detailed explanation of this invention reference will be had to the accompanying drawings, in which—

Fig. 1 is a side elevational view of an apparatus embodying this invention, certain parts being sectioned.

Fig. 2 is a plan view of the apparatus shown in Fig. 1.

Fig. 4 is a side elevational view of a carriage for a stylus shown in Figs. 1 and 3.

Fig. 5 is an end view of the carriage shown in Fig. 4.

Figure 3:
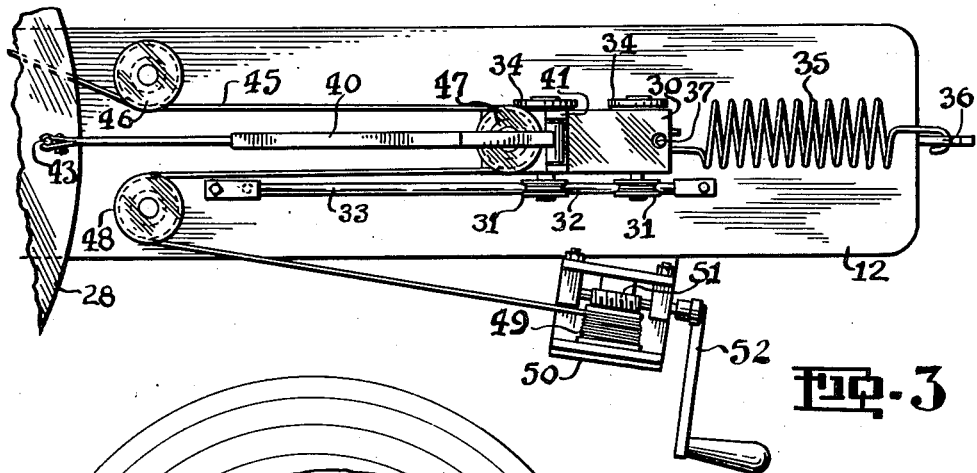
Fig. 3 is an enlarged detail view of a section of the apparatus shown in Fig. 2.

Referring more particularly to the drawings, 5 indicates a tubular casing through which a shaft 6, provided with a vane 7 at its lower end, projects. The upper end of shaft 6 is coupled to one or more extension shafts 8 of larger diameter, the number of extension shafts 8 being determined by the length of casing 5 to permit projection of the vane 7 a substantial distance beyond the lower end of casing 5. Between each length of extension shaft a bearing 9 may be provided to serve as a centering means for the extension shafts within the casing and to reduce surface friction between the shaft and casing.

A sleeve 10 is fitted over the upper end of casing 5. Sleeve 10 is welded or otherwise secured to the under side of a frame 11 which carries a platform 12. Frame 11 is provided with upper and lower bearings 14 and 15 through the inner races of which a hollow tube 16 extends from the base of frame 11 to project beyond the upper surface of platform 12. The projecting upper portion of tube 16 carries an assembly comprising a collar 17, a sprocket 18 secured to the upper surface of collar 17 and a sheave 19 of greater diameter than sprocket 18, said sheave and sprocket having their adjacent surfaces secured together. Tube 16 extends into a central opening through said collar, sprocket and sheave and is secured thereto for rotation therewith. A shaft 20 extends downwardly through tube 16 and is secured to the upper end of extension shaft 8. Key slots 21 are provided at the upper end of tube 16 and shaft 20 is secured to rotate with tube 16 by suitable keys carried by the shaft and receivable in key slots 21 in the upper end of tube 16.

Platform 12 carries a second sprocket 24 at one side of sprocket 18. Sprocket 24 is fixed to rotate with a shaft 25 mounted in bearing 26 which is secured to platform 12. A chain 27 connects the sprockets 18 and 24. A disc 28 is mounted on the upper end of shaft 25 and is secured thereto to rotate with the sprocket 24 in response to rotation of sprocket 18.

A carriage 30 is mounted on platform 12 at the side of disc 28 remote from sheave 19. The wheels 31 on one side of carriage 30 are groove, as indicated at 32 to enable the same to be guided along a track 33 in the direction of disc 28. The wheels 34 on the opposite side are designed to ride over the surface of platform 12. Carriage 30 is normally retracted to a position remote from the disc 28 by a spring 35 having one end secured to an anchor 36 at the outer end of platform 12 and the other end connected to the adjacent end of carriage 30 by a coupler 37.

Carriage 30 carries a stylus support including an arm 40 connected at one end to an upright yoke member 41 by a horizontal pivot 42. The free end of arm 40 is adapted to retain a suitable stylus 43 with its point directed downwardly for contact with a graph sheet 44 on the upper surface of disc 28.

A cable 45, having one end anchored at a predetermined point on sheave 19, is trained around the grooved surface of the sheave, then extends toward carriage 30. An intermediate pulley 46 mounted on platform 12 directs cable 45 from said pulley to the carriage so as to parallel track 33 at one side thereof. The cable then is trained around a second pulley 47 carried by carriage 30 and then is doubled back to a third pulley 48 on platform 12 which is disposed to arrange the cable length from the pulley 47 thereto parallel to track 33 on the side opposite to the first mentioned parallel section of cable. The cable is then connected at its opposite end to a winding drum 49 mounted on a stand 50 secured to one side of platform 12. The stand 50 is angularly disposed so that the cable is fed from pulley 48 to the drum at right-angles to the axis of the drum. A worm gear 51 operated by a crank 52 serves to rotate the drum.

In operation, a length of casing 5 is first sunk into the ground for a required depth. Soil is removed from the interior of the casing and then shaft 6 with vane 7 is inserted through the casing, employing as many lengths of extension shafts 8 as required, until the vane 7 extends into the ground beyond the lower end of casing a sufficient depth to ensure that the vane is in ground which has been undisturbed by the sinking of casing 5. Sleeve 10 with frame 11 and platform 12 mounted thereon is then placed over the upper end of casing 5 and shaft 20 extending through sheave 19, sprocket 18, collar 17 and tube 16 is connected to the upper end of the uppermost extension shaft 8. Suitable keys in key slots 21 then lock the shaft 20 to tube 16 to ensure rotation of the shaft with tube 16 as well as sprocket 18 and sheave 19.

In order to test the shear strength of the soil, tension is applied to cable 45 by rotating drum 49. This tension exerts a forward pull on carriage 30 against the biasing of spring 35 causing the stylus 43 to move inwardly over the surface of graph paper 44 on disc 28. At the same time the tension on the cable causes rotation of sheave 19 which in turn causes sprocket 18 to rotate disc 28 through sprocket 24. The ratio of sprockets 18 and 24 is such that the strain shown on the graph is five times the strain in the soil. Spring 35 is calibrated so that its extension is a measure of the torque required to turn the vane 7. Thus it will be appreciated that while the stylus is moved radially toward the centre of the disc 28 through the movement of carriage 30 along track 33, the disc 28 is being rotated through the medium of sprockets 24 and 18, so that the resultant tracing of the stylus on graph 44 will be a spiral configuration until a cylinder of soil between the outer edges of the vanes 7 is sheared from the surrounding soil.

Figure 8:
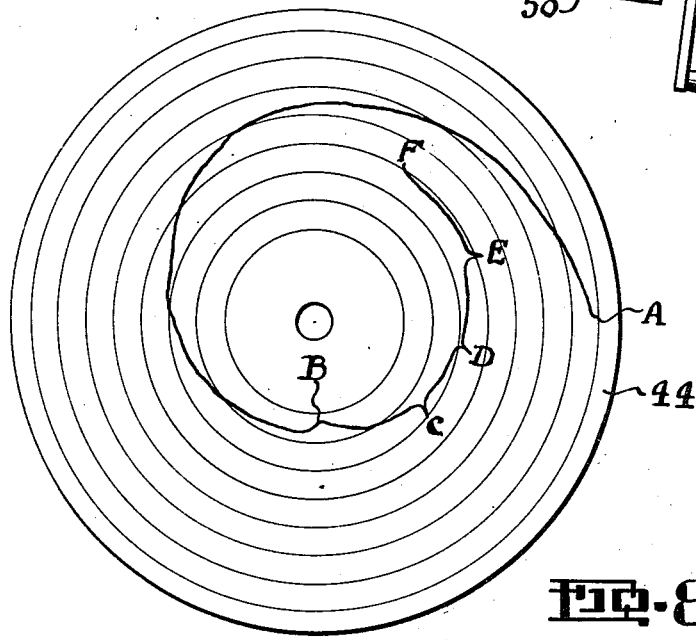
Fig. 8 is a view showing a sample graph sheet for the recording disc shown in Figs. 1 and 2, upon which a measurement has been recorded.
Figure 6:
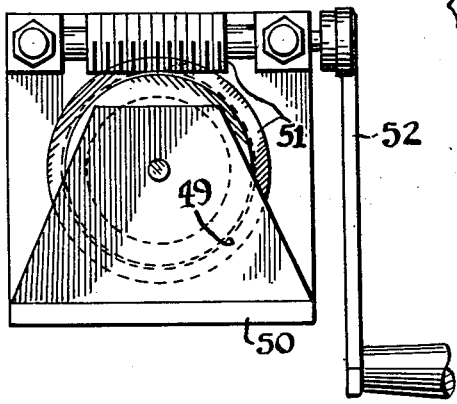
Fig. 6 is an elevational view (enlarged) of the winding drum shown in Fig. 3.
Figure 7:
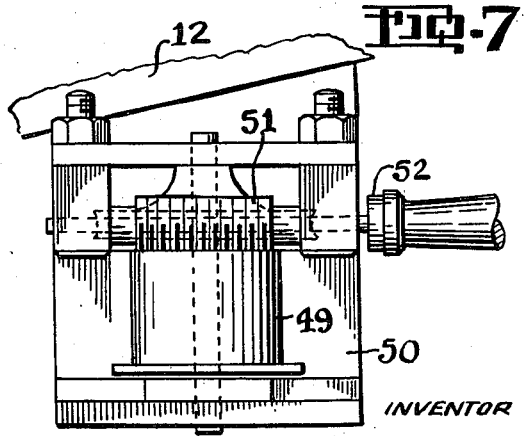
Fig. 7 is a plan view of the winding drum shown in Fig. 6.

From a study of the graph 44 in Fig. 8, it will be seen that the stylus tracing commenced at A and followed a spiral path toward the centre of the graph to point B by applying a constant strain on cable 45 through the medium of drum 49. Assuming each concentric circle on the graph 44 to represent a unit of stress, it will be seen that it required a stress on spring 35 of between six and seven of these units to shear a cylinder of soil at point B between the vanes 7 from the surrounding soil. As the stylus arm 40 moves radially relative to disc 28 the radial distance between points A and B on the graph is a measure of the stress on the soil. The length of the spiral tracing on the graph between points A and B indicates the amount of rotation of shaft 20 required cause a shear of the cylinder of soil between the vanes 7 during the stress period, the ratio being previously indicated as 5 to 1. From points B to C the graph indicates a continued rotation of the vane 7 under stress from the winding of cable 45 about drum 49 after shearing of the soil at point B. At point C the cable was slackened off and then, tension was again taken to determine the amount of surface friction remaining between the cylinder of soil between the vanes and the surrounding soil. This was repeated between points C and D, D and E, E and F. The results showed a gradual slackening off of the tension on spring 35, indicating a continuous decrease in the surface friction between the sheared cylinder and the surrounding soil.

What I claim is:

1. An apparatus for measuring the shear strength of soil, including a shaft provided at one end with a vane for insertion into the ground with the upper end of said shaft extending above the ground, a driven member carried by the upper end of said shaft for rotating said shaft, a recording disc mounted at one side of said driven member, said driven member being operably connected to said disc for rotating said disc when said shaft is rotated, a stylus mounted over said disc for recording thereon, said stylus being movable in opposite directions radially of said disc, calibrated resilient means connected to said stylus and normally biasing said stylus in one radial direction, and actuating means operably connected to said driven member and to said stylus to rotate said driven member and to move said stylus radially over said recording disc against the calibrated biasing thereof to thereby record on said disc the torque required to rotate said vane and the degree of stress required to shear a cylinder of soil within the vane from the surrounding soil.

2. An apparatus for measuring the shear strength of soil, including a shaft provided at one end with a vane for insertion into the ground with the upper end of said shaft extending above the ground, a driven member carried by the upper end of said shaft for rotating said shaft and vane, a member having a permanent record receiving surface disposed in a horizontal plane at one side of said driven member, a stylus mounted over said record receiving surface for recording thereon, said stylus being movable lineally relative to said record receiving surface, calibrated resilient means connected to said stylus and normally biasing said stylus for lineal movement in one direction, and actuating means operably connected to said driven member and to said stylus to rotate said driven member and to move said stylus lineally over said record receiving surface against the calibrated biasing thereof to thereby record on said record receiving surface the degree of stress required to shear a cylinder of soil within the vane from the surrounding soil.

3. An apparatus as set forth in claim 1, in which said driven member comprises a sheave axially mounted on the upper end of said shaft for rotation therewith.

4. An apparatus as set forth in claim 3, including a sprocket secured to said shaft, a second sprocket secured to said recording disc and a chain connecting said sprockets for driving said disc in response to rotation of said sheave.

5. An apparatus as set forth in claim 1, including a carriage member mounted at one side of said disc remote from said shaft for lineal movement, said stylus being mounted on said carriage for movement radially of said disc in response to lineal movement of said carriage.

6. An apparatus as set forth in claim 1, in which said calibrated resilient means comprises a tension spring.

7. An apparatus as set forth in claim 1, in which said actuating means comprises a cable having one end portion trained around and anchored to said driven member and having an intermediate portion thereof arranged in driving engagement with said stylus and a winding drum to which the other end portion of said cable is connected, said cable being wound around said drum.

8. An apparatus for measuring the shear strength of soil, including a shaft provided at one end with a vane for insertion into the ground with the upper end of said shaft extending above the ground, a platform carrying frame fitted about the upper end of said shaft for free rotation of the latter relative to said frame, a platform arranged on said frame to extend to one side thereof, a sheave axially mounted on said upper end of the shaft above said platform and fixed to rotate with said shaft, a recording disc mounted on said platform at one side of said sheave and rotatable about an axis parallel to the axis of said shaft, said sheave being operably connected to said disc for rotating the latter in response to rotation of said sheave, a stylus, a stylus carrying member supporting said stylus over said disc for recording thereon, said stylus carrying member being mounted on said platform at one side of said disc remote from said shaft and being movable along said platform for radial movement of said stylus relative to said disc, calibrated resilient means connected to said carrying member and normally biasing said carrying member for radial movement of the stylus in one direction, and actuating means operably connected to said sheave and to said carrying member to rotate said sheave and to move said carrying member against the biasing thereof to thereby cause said stylus to record on said disc the stresses exerted to rotate said shaft and to move said stylus carrying member against the normal biasing thereof.

9. An apparatus as set forth in claim 8, in which said stylus carrying member comprises a carriage mounted on wheels, a track carried by said platform on which said carriage is mounted for confined lineal movement to ensure radial movement of the stylus relative to said disc, an arm member having one end mounted on said carriage for swinging movement about a horizontal axis, said stylus being retained by the free end of said arm member so as to be in recording contact with the upper surface of said disc, and said calibrated resilient means being connected to the end of said carriage remote from the disc to normally bias said carriage outwardly from said disc.

10. An apparatus as set forth in claim 8, in which said actuating means comprises a cable having one end secured to said sheave, said cable being trained about said sheave and having an intermediate portion operably connected to said carrying member, a winding drum carried by said platform, said cable having its other end secured to said drum so that winding of said drum exerts rotary movement to said sheave and lineal movement to said carrying member in a direction opposed to the normal biasing tension of said calibrated resilient means.

References Cited in the file of this patent

UNITED STATES PATENTS

| | | |
|---|---|---|
| 722,576 | Grand | Mar. 10, 1903 |
| 2,382,979 | Demb | Aug. 21, 1945 |
| 2,603,967 | Carlson | July 22, 1952 |
| 2,607,218 | Hansen | Aug. 19, 1952 |

FOREIGN PATENTS

| | | |
|---|---|---|
| 134,834 | Sweden | Mar. 11, 1952 |